Sept. 12, 1967    R. W. BICKFORD    3,341,268
UTILITY CABINET
Filed Aug. 6, 1965

RALPH W. BICKFORD
INVENTOR.

BY

Townsend and Townsend

United States Patent Office 3,341,268
Patented Sept. 12, 1967

3,341,268
UTILITY CABINET
Ralph W. Bickford, Napa, Calif., assignor to James L. Hall Co., Inc., San Francisco, Calif., a corporation of California
Filed Aug. 6, 1965, Ser. No. 477,853
4 Claims. (Cl. 312—100)

ABSTRACT OF THE DISCLOSURE

A weatherproof outdoor utility cabinet having a pair of inwardly extending, angularly disposed intersecting surfaces which provide support for a plurality of utility outlets. The cabinet includes a cover panel pivotally mounted over the pair of intersecting surfaces to shield them from inclement environmental conditions. The cover panel terminates below all the utility outlets but sufficiently above the outward edge of the lower intersecting surface to provide a slot through which conduits may be extended when the cover panel is in the closed position.

---

This invention relates to an outdoor utility cabinet for housing service cables such as electrical power lines and telephone lines. More particularly, my novel device is directed to such a cabinet for use, for example on boat docks and the like, and is so constructed that exposure to the weather will not generally interfere with its successful operation.

In recent years, with the growth in the number of pleasure craft in and around various navigable and recreational waterways, there has appeared an evergrowing number of so-called marinas or floating docks to accommodate such small boats or pleasure craft. Most of these vessels when tied alongside docking facilities may require or at least desire electrical power service and in some instances temporary telephone hookups.

Under some presently available facilities such power and other utilities are made available by makeshift cord connections; and where makeshift arrangements are prohibited by local code restrictions, connections are made through conventional outlet stations which may be exposed to the weather unduly or subject to somewhat cumbersome conventional outdoor shielding arrangements of various types and descriptions.

Broadly stated, the present invention is directed to a relatively simple utility cabinet so constructed that exposure to the weather will not generally interfere with its successful operation. Specifically, the utility cabinet of this invention includes the support panel formed in the front surface thereof and extending inwardly therefrom to provide a surface to which is secured at least one utility outlet.

A cover panel is pivotally attached to the cabinet housing and normally occupies a closed vertical position overlying the cabinet opening and the support panel within. Pivoting the cover panel to an open position permits easy access to the utility outlet for connection to a utility extension cord. When the cover panel is in its closed position, the lower edge extends below the elevation of the lowermost utility outlet, but somewhat above the bottom of the cabinet opening so as to form a slot through which utility cables may pass from connection within the panel outwardly to the craft being serviced.

A feature and advantage of the invention is that by placing the utility outlet on an inclined support panel within the utility cabinet, a so-called drip loop is established by the extension cord extending from the utility outlet within the cabinet to the craft; and the outlets on the inclined support panel are shielded by the cover panel. In this way a reasonably weatherproof arrangement is achieved whereby a considerable amount of wind and rain outside of the cabinet will not substantially interfere with the integrity of the electrical connection due to the shielding achieved by the cover panel and the inclined surface of the support panel. Since the lowermost outlet is above the lower edge of the cover panel in its closed position, even rain or sleet which is wind-driven in a horizontal path ordinarily will not make direct contact with the outlet; and the sloping support panels provide for moisture drainage away from the interior of the cabinet.

Another feature and an advantage to the above described utility cabinet is that it may be permanently attached to a floating dock or boat marina and provide a relatively weatherproof housing having convenient access connections for the craft to be serviced.

Another object of this invention is to provide a utility cabinet of the character described herein having at least two support panels extending inwardly from the opening with both panels inclined at an angle, one upwardly and the other downwardly, in a converging arrangement.

A feature and advantage of the last stated object is that the upper, downwardly sloping surface may be used to accommodate one set of cables, and the lower upwardly sloping surface another set. Since the upper surface is even less likely to encounter any moisture, such surface may be used to support power outlets, for example, while the lower surface may take less high current devices such as telephone lines and the like.

Other objects, features and advantages will become apparent upon a reading of the specification which follows and by referring to the accompanying drawing wherein similar characters of reference correspond to the same parts in the several views.

Turning now to the drawings, FIG. 1 is a front elevation of my device with a portion of the front shown fragmented to reveal certain internal details;

My invention embodies a structure or a novel outdoor utility cabinet wherein the utility outlets themselves are supported on inclined panels inside the front opening of the cabinet which in turn is shielded by a pivoted front cover. When in the closed position, the lower edge of the front cover, unlike most utility cabinets with which I am familiar, is disposed somewhat above the bottom of the front cabinet opening and yet at an elevation lower than the lowermost utility outlet supported on the internal inclined panels within the cabinet. In this manner a generally weatherproof utility cabinet is provided having a relatively simple access for connecting and disconnecting utility extension lines to the outlets supported on the panels inside the cabinet.

Figure 1:
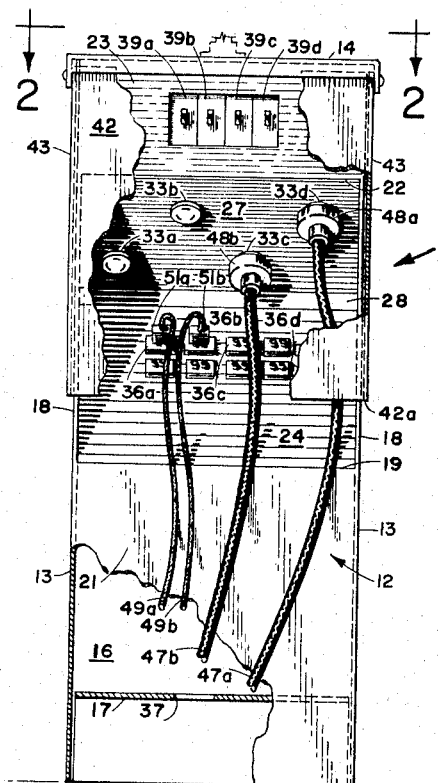

The invention is best understood by referring first to FIG. 1 wherein I show a utility cabinet generally at A which embodies my invention and which has a front section indicated at 12, sides 13, top panel 14, a back panel 16, and bottom closure 17. The front portion indicated at 12 has an opening formed therein which, in the particular embodiment shown in the drawing, is defined by forward edges 18 of sides 13, the upper edge 19 of lower front panel portion 21, and lower edge 22 of upper inset front panel portion 23. Extending inwardly from edge 19 is inclined lower panel support 24 also seen in FIG. 3. Panel support 24 extends back into the cabinet and may be secured by welding, riveting, or other suitable means to the inside surfaces of sides 13 and terminates toward the rear of the cabinet to form lip 26. Upper inclined panel support 27 extends into the cabinet housing at an inclined angle from edge 22, in a manner similar to that described for lower support panel 24, and terminates in a lip 28 which may be fastened by welding, bolting, or other suitable means to lip 26. Thus there is formed within the cabinet housing an access compartment 34 and a wiring compartment 29 which may be adapted to accommodate the various power and communication line circuits having conventional terminal boxes 31a–31d and 32a–32d, respectively. One satisfactory embodiment of my invention is to locate power terminal boxes 31 on the upper inclined support panel 27 with conventional twist lock outlets 33 facing downwardly and at an angle within internal protected access 34. Lower support panel 24 may be used satisfactorily to accommodate communication junction boxes 32 having panel outlets 36 facing upwardly and at an angle into access portion 34.

Figure 2:
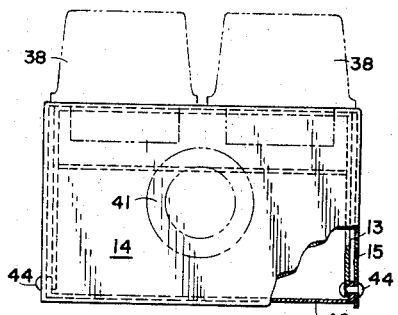
FIG. 2 is a plan view taken along lines 2—2 of FIG. 1 and with one corner fragmented to show certain details below.

A swinging cover 42 is provided to form a weather shield for access portion 34 and the various conduit connections described herein in respect to support panels 24 and 27. In the embodiment that is shown on the accompanying drawing the cover is provided with a pair of side flanges 43 attached to or formed continuously from front portion 42. Top panel 14 is also provided with a pair of overhanging lips 15 which extend just out and beyond side panels 13 so that the interval formed therebetween may accommodate edges 43 of the front panel. A front flange 14a is also formed vertically down from the top panel and continuous with it to shield the top edge of cover 42. Pins 44 which are suitably connected through lips 43, outer edge 15, and side panel 13, form a pivotal connection for front panel 42 so that it may be swung through the arc indicated by dimension 46 from the closed position, shown generally in FIGS. 1 through 3, to the open position shown by the interrupted line in the upper portion of FIG. 3.

I have found that by staggering outlet boxes for 220 volt, 3-phase, 60 cycle current, with a maximum load-carrying capacity of about 30 to 40 amps, in the W-pattern as shown on panel 27 in FIG. 1, I am able to place four such outlets in a minimum width panel thus maintaining a relatively economic cabinet size. The use of 3-phase, 220 volt power enables my utility cabinets to accommodate larger pleasure craft wired for such power as well as smaller craft using 110 volt power available from adjacent legs of the same power circuit.

Figure 3:
FIG. 3 is a side elevation of my invention as shown in FIG. 1 along lines 3—3 thereof and wherein a portion of the side is shown removed to reveal certain internal details.
Figure 3:
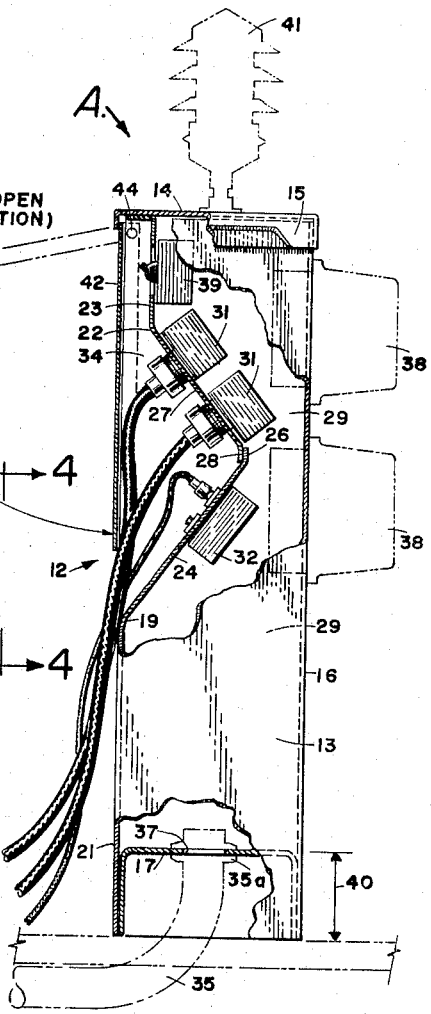

The lower portion of the utility cabinet embodying my invention has mounted therein bottom panel 17 which is provided with an elliptical opening whose circumferential edge 37 may be seen in the lower portion of FIGS. 1 and 3. In accordance with most local electrical code provisions, the minimum size conduit for four power outlets, as described above, coming from beneath the thickness of planking found on most floating docks or marinas requires a dimension 40 equal to about 7 inches to achieve the minimum radius of conduit L35 and coupling 35a into the cabinet through the opening having edge 40. Dimension 40 is not critical, however, and may be varied to accommodate other power outlet arrangements not shown in the drawing but embodying my invention.

Conventional meters 38 may be mounted on the back side of my panel; and each of the main power outlets 33a–33d may be connected by means of conventional circuitry, not described nor shown herein, to circuit breakers 39a, b, c, and d, respectively. A conventional outdoor lamp 41 may be provided on the top of the utility cabinet to indicate the cabinet's presence on the dock and provide localized light for making connections within the cabinet during darkness.

During ordinary use of my utility cabinet it is merely necessary for the owner of a pleasure craft moored nearby to bring an extension line having a conventional 3-phase 220 volt 3-prong twist lock plug, or one adapted to tap two legs thereof for 110 volt service, lift cover 42 from its closed to open position, insert the plug in the appropriate utility receptacle 33a, b, c, or d, within access 34, throw corresponding circuit breaker 39a, b, c, or d from closed to open position, and then permit the movable panel 42 to be returned to its closed position. Similarly, if accommodations and desirability for so doing are provided, as they may be in a utility cabinet embodying my invention, a communication line such as line 49a or 49b, having male portions 51a and 51b, respectively, may be inserted in corresponding female outlets 36a through d.

As can best be seen in FIG. 1 with cover 42 in a closed position, a slot is defined by lower edge 42a, sides 13 and lower front panel upper edge 19, through which cables such as lines 47a, 47b, 49a, and 49b, may extend forming a so-called drip loop; however, no connection is directly exposed to a direct line of rain or other weather even under high wind conditions which tend to be the most obstructive to proper operation of electrical connections under such circumstances. Moreover, by the novel expedient of placing the various outlets 33 and 36 on sloping support panels 27 and 24, what moisture may be deposited thereon, particularly that which may enter through the slot onto the lower panel 24, is directed away from the outlets by means of gravity flow. The circuit breakers at 39a through d are in a particularly protected area being directly under the overhanging portion of top panel 14.

Thus it can be seen that, after making the various connections to the utility cabinet embodying my invention as described above and shown on the accompanying drawing, a relatively weatherproof arrangement for temporary power lines and the like is achieved in a generally simple and novel manner.

Figure 4:
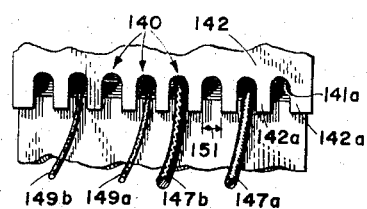
FIG. 4 is an alternate embodiment of the front of my invention as would be seen along lines 4—4 shown in FIG. 3.

In FIG. 4 I show one possible alternate embodiment of the swinging front cover panel therein shown as panel 142. In that embodiment the front panel is provided with a series of notches or scalloped portions indicated at 140 having upper curved portions 141a and broken lower edge portions 142a. Interval 151 is formed at least large enough to accommodate cables such as 147a and h and 149a and b, and upper edge portion 141a is at least slightly below the elevation of the lowest conduit outlet (not shown) on the inner inclined support panels.

Although I have described my invention in respect to a specific embodiment in the foregoing specification, along with one alternate embodiment of the cover panel itself, it is understood that a number of modifications may be made within the spirit of the invention and scope of appended claims.

What is claimed is:

1. A weatherproof outdoor utility cabinet adapted to receive at least one utility cable comprising a container having back, side, top and front sections; said front section including spaced upper and lower vertical portions and a central mounting support having a pair of opposed ends secured to the confronting edges of said upper and lower vertical portions, said support including a pair of inwardly extending intersecting surfaces, angularly disposed in relation to said vertical portions; at least one utility outlet secured through each of said surfaces; a cover panel pivotally attached to said side sections immediately beneath said top section for movement from a closed position to an open position with respect to said front section, said cover panel having a width sufficient to extend beyond said side sections, and having side flanges disposed relative to said cover panel, and a lower edge extending below said at least one utility outlet when said panel is in said closed position; said cover panel and the confronting edge of said lower vertical portion defining a slot of sufficient width to receive at least one utility cable when said panel is in said closed position whereby said cover panel can be pivoted to the open position to allow connection of said at least one utility cable to said at least one utility outlet in said pair of surfaces and returned to the closed position to protect said at least one utility outlet from exposure to weather.

2. A weatherproof outdoor utility cabinet in accordance with claim 1 wherein said pair of surfaces intersect in an obtuse angle.

3. A weatherproof outdoor utility cabinet in accordance with claim 1 wherein said top section is further characterized by a front flange extending vertically downward to shield the top edge of the cover panel.

4. A weatherproof outdoor utility cabinet in accordance with claim 1 wherein the lower edge of said cover panel is irregularly shaped to receive said utility cables when disposed in the closed position.

References Cited
UNITED STATES PATENTS

| | | | |
|---|---|---|---|
| 2,457,347 | 12/1948 | Casler et al. | 174—52 |
| 2,603,546 | 7/1952 | Lais | 312—100 |
| 3,140,904 | 7/1964 | Preston et al. | 312—38 |

DAVID J. WILLIAMOWSKY, *Primary Examiner.*

J. L. KOHNEN, *Assistant Examiner.*